United States Patent
Krishnan et al.

(10) Patent No.: US 7,907,898 B2
(45) Date of Patent: Mar. 15, 2011

(54) ASYNCHRONOUS INTER-PICONET ROUTING

(75) Inventors: Ranganathan Krishnan, San Diego, CA (US); Sanjiv Nanda, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1289 days.

(21) Appl. No.: 10/809,996

(22) Filed: Mar. 26, 2004

(65) Prior Publication Data

US 2005/0215196 A1    Sep. 29, 2005

(51) Int. Cl.
*H04B 7/00* (2006.01)
(52) U.S. Cl. ....... 455/41.2; 455/445; 455/428; 370/390; 370/432; 370/312
(58) Field of Classification Search .................. 455/41.2, 455/517–519, 41.3, 67.11, 503, 515, 574, 455/127.5, 343.1, 343.5, 436, 437, 428, 445, 455/456.1; 370/390, 432, 312
See application file for complete search history.

(56) References Cited

U.S. PATENT DOCUMENTS

| | | | |
|---|---|---|---|
| 6,026,297 A | | 2/2000 | Haartsen |
| 6,771,963 B1 * | | 8/2004 | Cheng et al. ................ 455/437 |
| 6,834,192 B1 * | | 12/2004 | Watanabe et al. ............ 455/444 |
| 6,967,944 B2 * | | 11/2005 | Choi ............................ 370/348 |
| 7,133,435 B2 * | | 11/2006 | Papasakellariou et al. ... 375/148 |
| 7,184,767 B2 * | | 2/2007 | Gandolfo ................... 455/435.2 |
| 2001/0002912 A1 * | | 6/2001 | Tony et al. .................... 370/487 |
| 2002/0031082 A1 * | | 3/2002 | Lundby et al. ............... 370/209 |
| 2002/0075940 A1 * | | 6/2002 | Haartsen ....................... 375/132 |
| 2002/0080855 A1 * | | 6/2002 | Watanabe et al. ............ 375/132 |
| 2002/0141375 A1 | | 10/2002 | Choi |
| 2003/0012264 A1 | | 1/2003 | Papasakellariou et al. |
| 2003/0036350 A1 * | | 2/2003 | Jonsson et al. ................. 455/41 |
| 2003/0125066 A1 | | 7/2003 | Habetha |
| 2003/0224787 A1 | | 12/2003 | Grandolfo |
| 2005/0037818 A1 * | | 2/2005 | Seshadri et al. ........... 455/569.1 |
| 2005/0130693 A1 * | | 6/2005 | Malladi et al. ............... 455/522 |
| 2005/0176468 A1 * | | 8/2005 | Iacono et al. .............. 455/562.1 |
| 2006/0209808 A1 * | | 9/2006 | Lundby et al. ............... 370/355 |

FOREIGN PATENT DOCUMENTS

| | | |
|---|---|---|
| EP | 0984649 A2 | 3/2000 |
| WO | 03047176 | 6/2003 |
| WO | 2005062559 | 7/2005 |

OTHER PUBLICATIONS

Office Action for Canadian Patent Application 2,561,112 dated May 7, 2009, 2 pages.
Office Action for Australian Patent Application 2005232062 dated Oct. 11, 2007, 1 page.
Office Action for Chilean Patent Application 0638-2005 dated Oct. 24, 2008, 2 pages.

(Continued)

*Primary Examiner* — Dominic E Rego
(74) *Attorney, Agent, or Firm* — Turocy & Watson, LLP

(57) ABSTRACT

Systems and techniques are disclosed relating to wireless communications. The systems and techniques involve wireless communications wherein a process, module or communications terminal is capable of engaging in intra-piconet communications. The process, module or communications terminal may also be used to detect a pilot signal from a foreign terminal, and establish a peer-to-peer connection with the foreign terminal to support communications if the pilot signal is below a threshold.

43 Claims, 7 Drawing Sheets

OTHER PUBLICATIONS

Office Action for Chilean Patent Application 0638-2005 dated Sep. 25, 2007, 8 pages.
Office Action for Chinese Patent Application 200580016526.8 dated May 8, 2009, 10 pages.
Office Action for Japanese Patent Application 2007-505076 dated May 19, 2009, 2 pages.
Office Action for Philippine Patent Application 1-2006-501896 dated May 15, 2009, 2 pages.
Office Action mailed Dec. 4, 2009 for Chinese Patent Application Serial No. 200580016526.8, 15 pages.
Russian Office Action Dated Dec. 7, 2007 for Russian Application Serial No. 2006137695, 2 pages.
Office Action mailed Apr. 28, 2010 for Philippine Application No. 1-2006-501896, 1 page.
Office Action mailed Aug. 4, 2010 for Canadian Application No. 2,561,112, 3 pages.
Office Action mailed Apr. 23, 2010 for Indian Application No. 5635/DELNP/2006, 2 pages.
Office Action mailed Apr. 26, 2010 for Chinese Application No. 200580016526.8, 35 pages.
Office Action mailed Jul. 15, 2010 for Philippine Application No. 1-2006-501896, 1 page.

* cited by examiner

ASYNCHRONOUS INTER-PICONET ROUTING

BACKGROUND

1. Field

The present disclosure relates generally to wireless communications, and more specifically, to various systems and techniques to schedule asynchronous transmissions within a network.

2. Background

In conventional wireless communications, an access network is generally employed to support communications for a number of mobile devices. These access networks are typically implemented with multiple fixed site base stations dispersed throughout a geographic region. The geographic region is generally subdivided into smaller regions known as cells. Each base station may be configured to serve all mobile devices in its respective cell. As a result, the access network may not be easily reconfigured to account for varying traffic demands across different cellular regions.

In contrast to the conventional access network, ad-hoc networks are dynamic. An ad-hoc network may be formed when a number of wireless communication devices, often referred to as terminals, decide to join together to form a network. Since terminals in ad-hoc networks operate as both hosts and routers, the network may be easily reconfigured to meet existing traffic demands in a more efficient fashion. Moreover, ad-hoc networks do not require the infrastructure required by conventional access networks, making ad-hoc networks an attractive choice for the future.

A completely ad-hoc network consisting of peer-to-peer connections generally results in very inefficient communications. To improve efficiency, the terminals may organize themselves into a collection of piconets. A "piconet" is a group of terminals in close proximity to one another. Each piconet may have a master terminal that schedules transmissions within its own piconet.

Numerous multiple access techniques exist to support communications in an ad-hoc network. A Frequency Division Multiple Access (FDMA) scheme, by way of example, is a very common technique. FDMA typically involves allocating distinct portions of the total bandwidth to individual communications between two terminals in the piconet. While this scheme may be effective for uninterrupted communications, better utilization of the total bandwidth may be achieved when such constant, uninterrupted communication is not required.

Other multiple access schemes include Time Division Multiple Access (TDMA). These TDMA schemes may be particularly effective in allocating limited bandwidth among a number of terminals which do not require uninterrupted communications. TDMA schemes typically dedicate the entire bandwidth to each communication channel between two terminals at designated time intervals.

Code Division Multiple Access (CDMA) techniques may be used in conjunction with TDMA to support multiple transmissions during each time interval. This may be achieved by transmitting each signal in a designated time interval with a different code that modulates a carrier, and thereby, spreads the signal. The transmitted signals may be separated in the receiver terminal by a demodulator that uses a corresponding code to de-spread the desired signal. The undesired signals, whose codes do not match, are not de-spread and contribute only to noise.

In TDMA systems that use spread-spectrum communications, each master terminal may schedule transmissions within its own piconet in a way that does not cause excessive mutual interference. However, it may be more difficult to manage interference from transmissions across multiple piconets. Accordingly, a robust and efficient scheduling algorithm is needed.

SUMMARY

In one aspect of the present invention, a method of communications from a piconet includes engaging in intra-piconet communications, receiving a pilot signal from a foreign terminal, determining that the strength of the pilot signal is below a threshold, and establishing a peer-to-peer connection with the foreign terminal.

In another aspect of the present invention, a communications terminal configured to operate in a piconet includes a receiver configured to detect a pilot signal from a foreign terminal and determine its strength, and a controller configured to establish a peer-to-peer connection with the foreign terminal to support communications if the pilot signal strength is below a threshold. The controller is further configured to support intra-piconet communications.

In a further aspect of the present invention, a communications terminal configured to operate in a piconet includes means for detecting a pilot signal from a foreign terminal, means for determining the strength of the detected pilot signal, means for establishing a peer-to-peer connection with the foreign terminal to support communications if the pilot signal strength is below a threshold, and means for supporting intra-piconet communications.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following detailed description, various aspects of the present invention may be described in the context of an Ultra Wide Band (UWB) wireless communications system. While these inventive aspects may be well suited for use with this application, those skilled in the art will readily appreciate that these inventive aspects are likewise applicable for use in various other communication environments. Accordingly, any reference to a UWB communications system is intended only to illustrate the inventive aspects, with the understanding that such inventive aspects have a wide range of applications.

Figure 1:
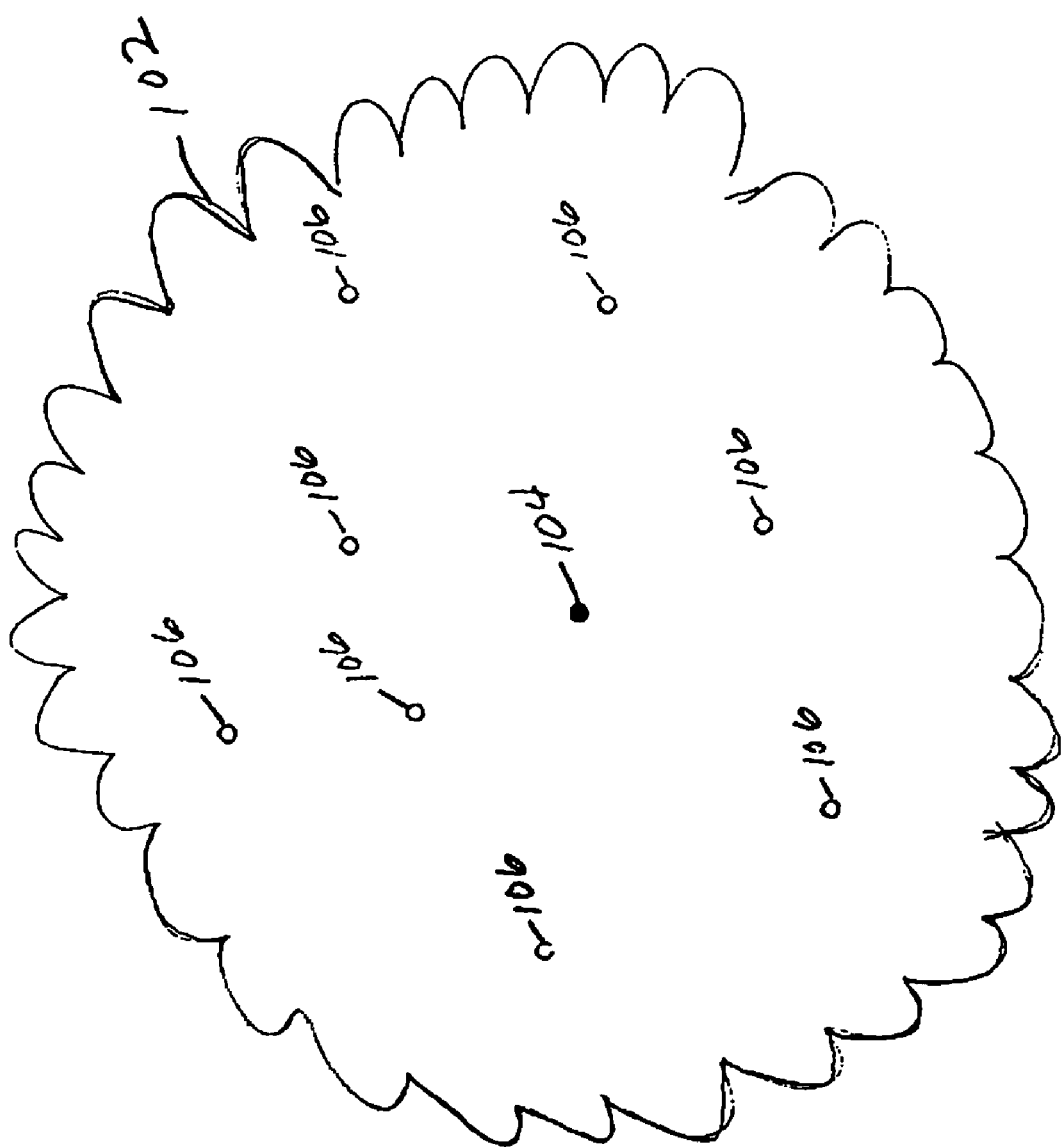
FIG. 1 is a conceptual diagram illustrating an example of a piconet.

FIG. 1 illustrates an example of a network topology for a piconet in a wireless communications system. A piconet 102 is shown with a master terminal 104 supporting intra-piconet communications between several member terminals 106. "Intra-piconet communications" refer to communications between two or more terminals within the same piconet. The terminals may be stationary or in motion, such as a terminal that is being carried by a user on foot or in a vehicle, aircraft, ship, or the like. The term "terminal" is intended to encompass any type of mobile communications device including cellular or wireless phones, personal data assistants (PDA), laptops, external or internal modems, PC cards, or any other similar devices. Within the piconet 102, the master terminal 104 may be able to communicate with each of the member terminals 106, and the member terminals 106 may also be able to directly communicate with one another under control of the master terminal 104. As to be explained in greater detail below, each member terminal 106 in the piconet 102 may also be able to directly communicate with terminals outside the piconet. These communications are referred to as "inter-piconet communications."

The master terminal 104 may communicate with the member terminals 106 using a multiple access scheme, such as TDMA, FDMA, CDMA, or another multiple access scheme. To illustrate the various aspects of the present invention, the wireless networks described throughout this disclosure will be in the context of a hybrid multiple access scheme employing both TDMA and CDMA technologies. Those skilled in the art will readily understand that the present invention is in no way limited to such multiple access schemes.

A piconet may be formed in a variety of ways. By way of example, when a terminal initially powers up, it may search for pilot signals from various piconet master terminals. The pilot signal broadcast from each piconet master terminal may be an unmodulated spread-spectrum signal, or another type of reference signal. In spread-spectrum communications, a pseudo-random noise (PN) code unique to each piconet master terminal may be used to spread the pilot signal. Using a correlation process, the terminal may search through all possible PN codes to locate a pilot signal from a master terminal, such as the pilot signal broadcast from the master terminal 104 in FIG. 1. The pilot signal may be used by the member terminal 106 to synchronize to the master terminal 104. The acquisition of a spread spectrum pilot signal is well known in the art.

The master terminal 104 may be used to manage high data rate transmissions. This may be achieved by allowing only those terminals that can support a minimum or threshold data rate with the master terminal 104 to join the piconet 102. In UWB communication systems, for example, a data rate of 1.2288 Mbps may be supported at a distance of 30-100 meters depending on the propagation conditions. In these systems, the master terminal 104 may be configured to organize the piconet 102 with member terminals 106 that can support a data rate of at least 1.2288 Mbps. If higher data rates are desired, the range may be further restricted. By way of example, data rates of 100 Mbps may be achieved in UWB systems at a range of 10 meters.

The member terminal 106 may be configured to determine whether it can satisfy the minimum data rate requirements of the piconet by measuring the link quality using the pilot signal broadcast from the master terminal 104. As discussed in greater detail above, a terminal may identify a pilot signal through a correlation process. The link quality may then be measured by computing the carrier-to-interference (C/I) ratio from the pilot signal by means well known in the art. Based on the C/I ratio computation, the member terminal 106 may then determine whether the minimum or threshold data rate may be supported by means also well known in the art. If the member terminal 106 determines that the minimum or threshold data rate may be supported, it may attempt to join the piconet 102 by registering with the master terminal 104.

Figure 2:
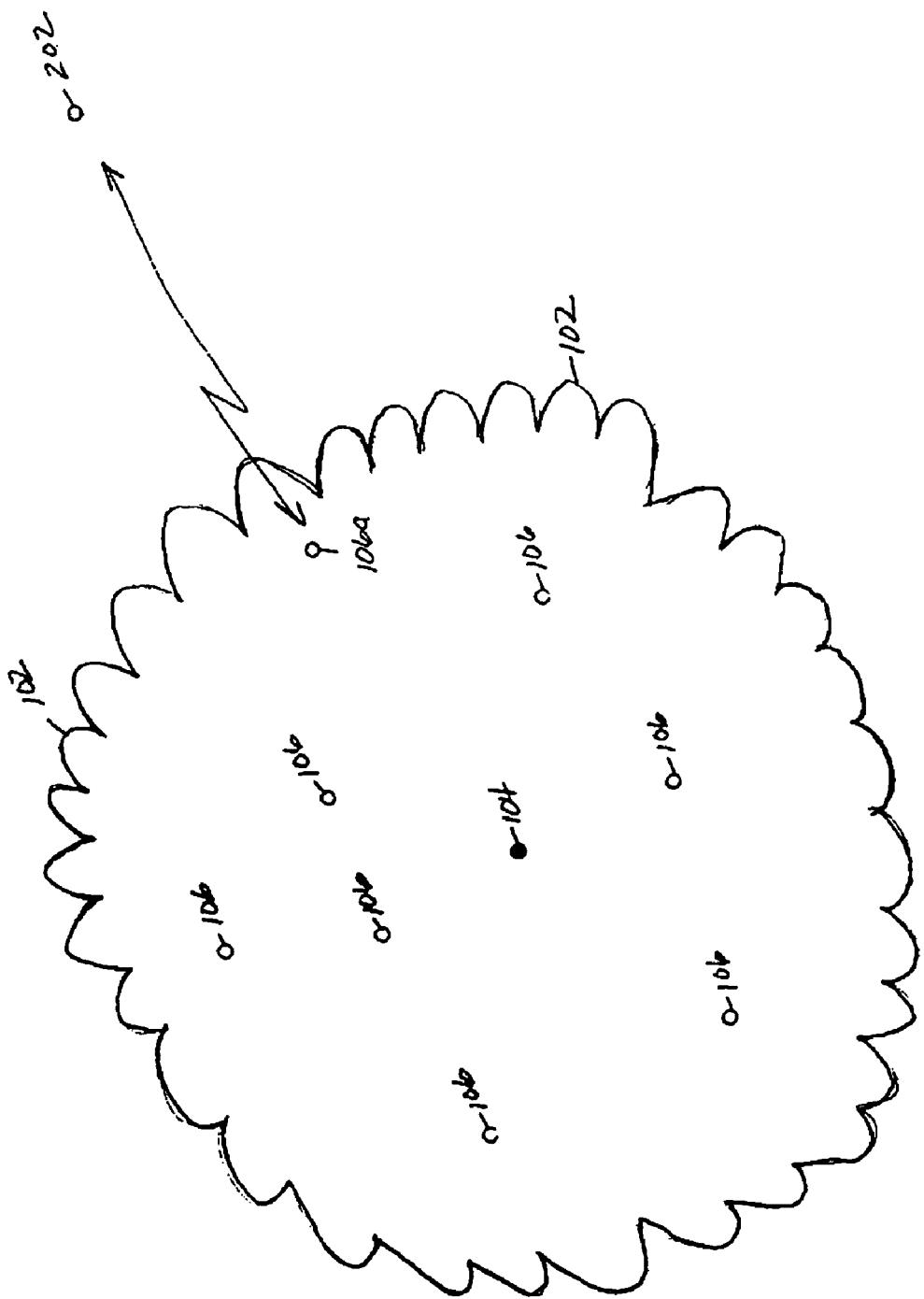
FIG. 2 is a conceptual diagram illustrating an example of a piconet having a peer-to-peer connection with an isolated terminal.

In some instances, a terminal may be unable to find a pilot signal of sufficient signal strength to support the minimum or threshold data rate. This may result from any number of reasons. By way of example, the terminal may be too far from the master terminal. Alternatively, the propagation environment may be insufficient to support the requisite data rate. In either case, the terminal may be unable to join an existing piconet. FIG. 2 illustrates an example of a network topology with a wireless terminal 202 unable to join the piconet 102 of FIG. 1.

Referring to FIG. 2, the terminal 202 may determine from the C/I ratio computed from the pilot signal broadcasted by the master terminal 104 that the minimum or threshold data rate cannot be sustained. As a result, the terminal 202 may begin operating as an isolated terminal independent of the piconet 102 by transmitting its own pilot signal. In a manner to be described in greater detail shortly, the isolated terminal 202 may engage in peer-to-peer communications with any member terminal 106 in the piconet 102 through a piconet edge terminal. "Peer-to-peer communications" or "peer-to-peer transmissions" refers to those communications or transmissions between terminals that are not entirely coordinated by a master terminal.

The master terminal 104 may designate any number of member terminals 106 as piconet edge terminals, such as member terminal 106a. The designation of piconet edge terminals may be based on feedback from the various member terminals 106. By way of example, the computed C/I ratio from each member terminal 106 may provide a rough indication of those member terminals located at the edge of the piconet 102. The piconet edge terminal 106a may be assigned the task of listening for pilot signals from isolated terminals. When a piconet edge terminal 106a detects a pilot signal from an isolated terminal whose signal strength is below a threshold, then the piconet edge terminal 106a may determine that the minimum or threshold data rate cannot be maintained with that isolated terminal 202. Based on this determination the piconet edge terminal 106a may add the isolated terminal 202 to a "peer-to-peer connectivity list." The peer-to-peer connectivity list may be a dynamic list maintained by the piconet edge terminal 106a that identifies all terminals outside the piconet 102 that may reached with a peer-to-peer transmission. Through an exchange of signaling messages, the piconet edge terminal 106a may forward a list to the isolated terminal 202 which includes all terminals in the piconet 102. The isolated terminal 202 may also include a peer-to-peer connectivity list which maps all terminals that can be reached through a peer-to-peer transmission with each known piconet edge terminal. With this approach, an isolated terminal that wishes to initiate a call with a far-end terminal simply consults its peer-to-peer connectivity list to identify the piconet edge terminal through which the call will be routed through to the far-end terminal.

Figure 3:
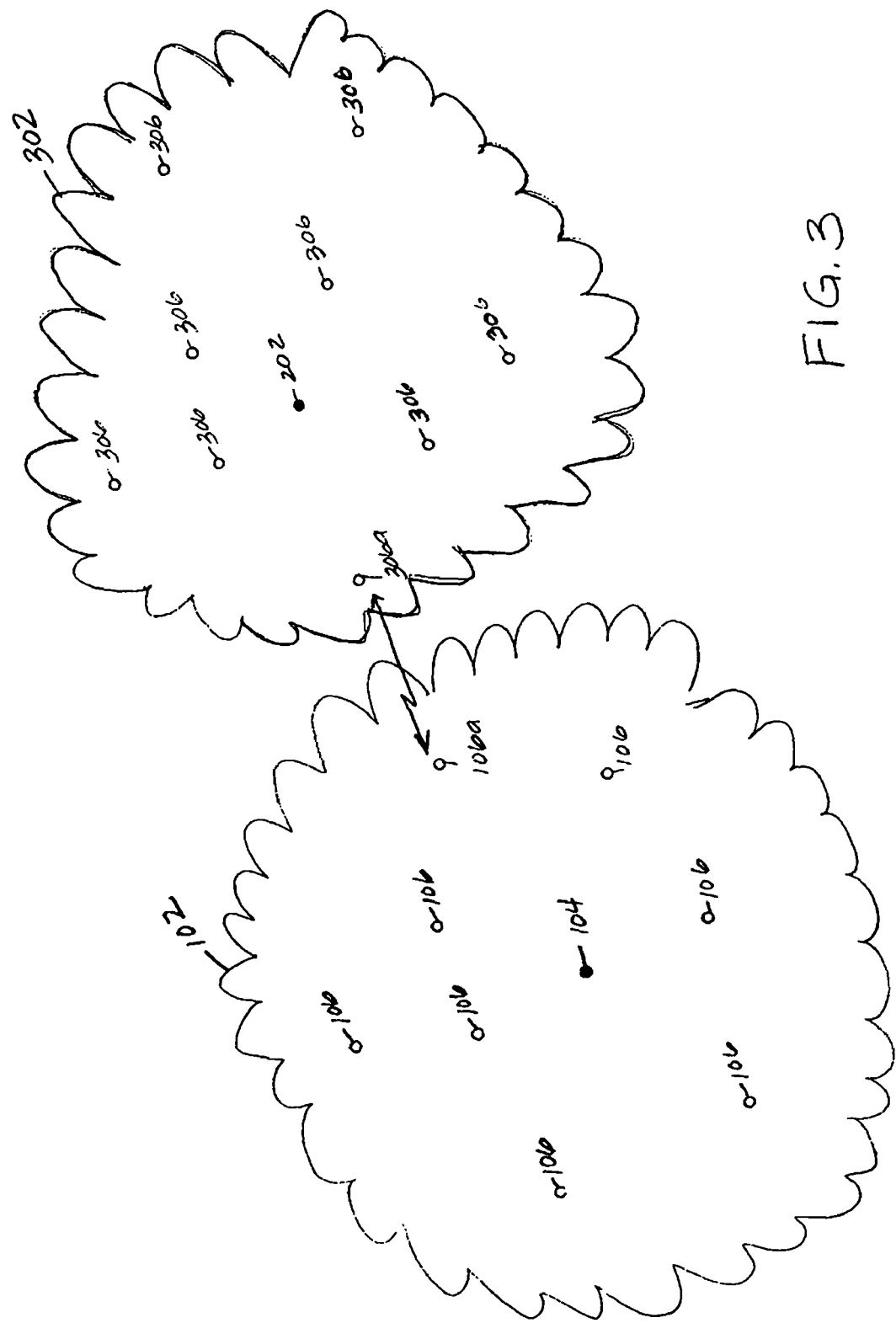
FIG. 3 is a conceptual diagram illustrating an example of two piconets having a peer-to-peer connection.

The isolated terminal 202 may become the master terminal for a new piconet. On power up, terminals that are able to receive the pilot signal broadcast from the isolated terminal 202 with sufficient strength may attempt to acquire that pilot signal and join the piconet of this isolated terminal. FIG. 3 illustrates an example of a network topology of this kind. The first piconet 102 is the same piconet described in connection with FIG. 1 with its master terminal 104 supporting several member terminals 106. The isolated terminal 202 described in connection with FIG. 2 has become the master terminal for a second piconet 302. The master terminal 202 in the second piconet 302 may be used to support multiple member terminals 306.

Using feedback from the various member terminals 306, the master terminal 202 in the second piconet 302 may designate one or more member terminals 306 as piconet edge terminals, such as member terminal 306a. As described in greater detail above, the master terminal 104 in the first piconet 102 may also designate one or more member terminals 106 as piconet edge terminals, such as member terminal 106a. In addition to listening for pilot signals broadcast from isolated terminals, each piconet edge terminal may also listen for pilot signals broadcast from other neighboring piconet master terminals. By way of example, when the piconet edge terminal 106a from the first piconet 102 detects the pilot signal broadcast from the master terminal 202 in the second piconet 302, whose signal strength is below a threshold, the piconet edge terminal 106a may determine that the minimum or threshold data rate cannot be maintained. Based in this determination, the piconet edge terminal 106a may exchange signaling messages with the master terminal 202 in the second piconet 302. The master terminal 202 may assign a piconet edge terminal 306a in the second piconet 302 to handle peer-to-peer communications with the first piconet 102, and forward instructions to the piconet edge terminal 106a in the first piconet 102 to add the assigned piconet edge terminal 306a to its peer-to-peer connectivity list. Accompanying these instructions may be a list of all terminals in the second piconet 302. The piconet edge terminal 106a in the first terminal 102 may update its peer-to-peer connectivity list by mapping each of these terminals to the assigned piconet edge terminal 306a in the second piconet 302. Similarly, the piconet edge terminal 106a in the first piconet 102 may forward a list of the terminals in the first piconet 102 to the assigned piconet edge terminal 306a in the second piconet 302. The assigned piconet edge terminal 306a may update its peer-to-peer connectivity list by mapping each of these terminals to the piconet edge terminal 106a in the first piconet 102.

This exchange of signaling messages and subsequent updating of the peer-to-peer connectivity lists facilitates calls across piconets. By way of example, if a first terminal in the first piconet 102 wishes to initiate a call with a second terminal in the second piconet 302, the first terminal may forward information identifying the second terminal to the piconet edge terminal 106a during call set-up. The piconet edge terminal 106a may consult its peer-to-peer connectivity list to identify the piconet edge terminal 306a in the second piconet 302 which serves the second terminal. The piconet edge terminal 106a may then establish a peer-to-peer connection with the piconet edge terminal 306a in the second piconet 302 to support the call. A similar procedure in the reverse direction may be used to initiate a call from the second terminal to the first terminal.

Alternatively, if the piconet edge terminal 106a determines from the pilot signal strength that the minimum data rate can be supported with the master terminal 202, the piconet edge terminal 106a may join the second piconet 302. With the piconet edge terminal 106a being a member of both piconets 102 and 302, it can act as an inter-piconet bridge terminal between the two master terminals 104 and 202 and allow the master terminals 104 and 202 to coordinate their scheduling activity in some fashion.

Figure 4:
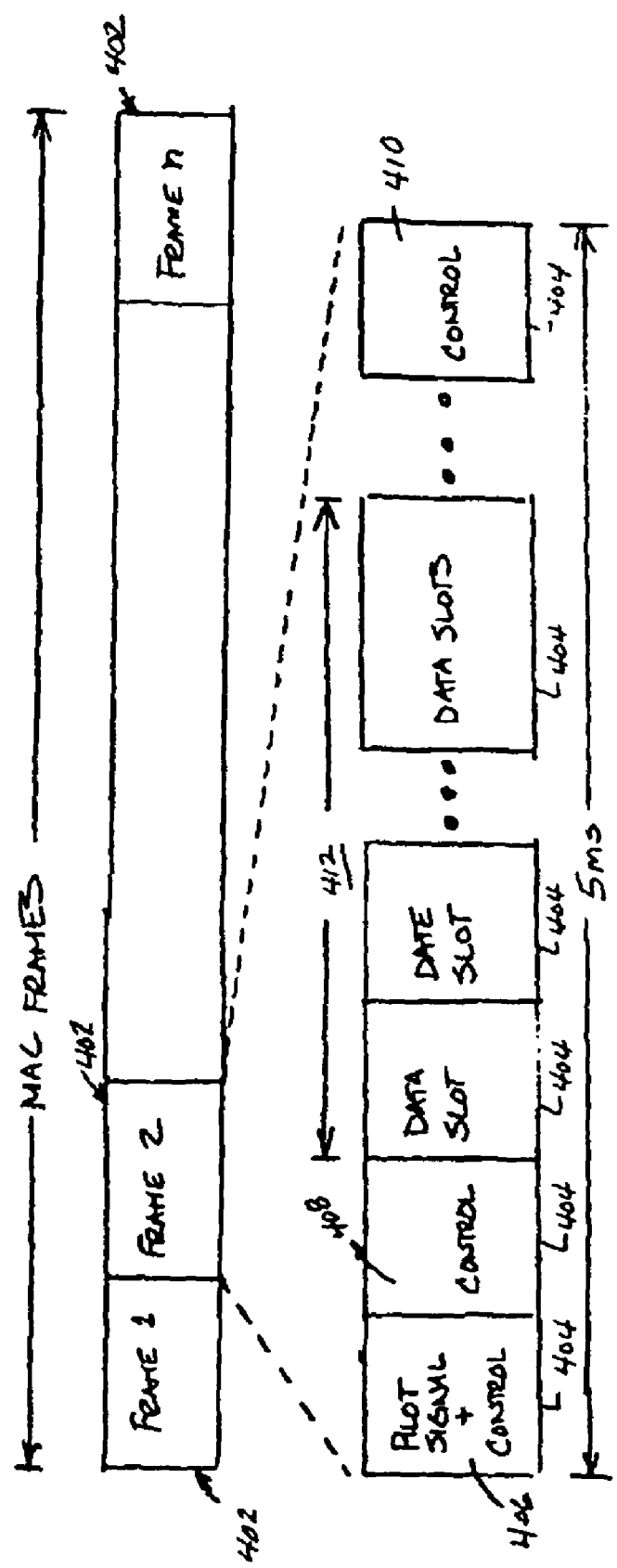
FIG. 4 is a conceptual diagram illustrating an example of a Medium Access Control (MAC) frame for controlling communications between terminals.

Turning to FIG. 4, a periodic frame structure may be used to support communications between terminals. This frame is typically referred to in the art as a Medium Access Control (MAC) frame because it is used to provide access to the communications medium for the terminals. The frame may be any duration depending on the particular application and overall design constraints. For the purpose of discussion, a frame duration of 5 ms will be used. A 5 ms frame is reasonable to accommodate a high chip rate of 650 Mcps and a desire to support data rates down to 19.2 kbps.

An example of a MAC frame structure is shown with n number of frames 402. Each frame may be divided into a number of time slots 404, by way of example 160 time slots. The slot duration may be 31.25 μs, which corresponds 20,312.5 chips at 650 Mcps. Any number of time slots within the frame may be dedicated to overhead. By way of example, the first slot 406 in the frame 402 may be used by the master terminals to broadcast a spread-spectrum pilot signal. The pilot signal may occupy the entire slot 306, or alternatively, be time shared with a control channel as shown in FIG. 4. The control channel occupying the end of the first slot 406 may be a spread-spectrum signal broadcast at the same power level as the pilot signal. The master terminals may use this control channel to define the composition of the MAC frame.

Scheduling information may be broadcast using one or more additional spread-spectrum control channels which occupy various time slots within the frame, such as time slots 408 and 410 in FIG. 4. The scheduling information may include time slot assignments for each active terminal. These time slots assignments may be selected from the data slots occupying a portion 412 of the frame 402. Additional information, such as the power level and data rate for each active terminal may also be included. Multiple terminal pairs may also be assigned to any given time slot using a CDMA scheme. In this case, the scheduling information may also include the spreading codes to be used for the individual communications between terminals.

Figure 5:
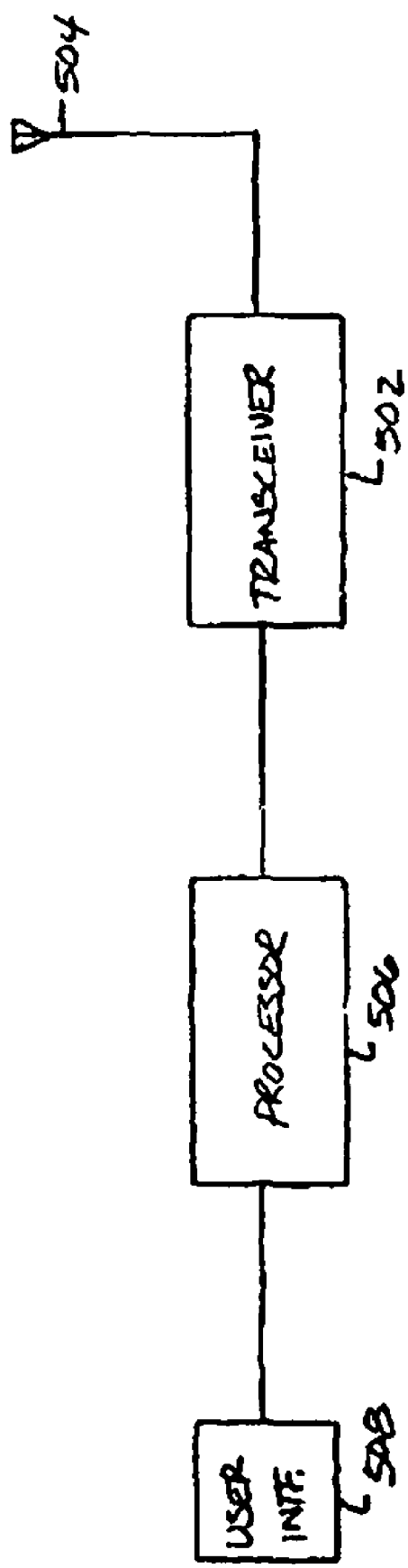
FIG. 5 is a functional block diagram illustrating an example of a terminal capable of operating within a piconet.

FIG. 5 is a conceptual block diagram illustrating one possible configuration of a terminal. As those skilled in the art will appreciate, the precise configuration of the terminal may vary depending on the specific application and the overall design constraints. For the purposes of clarity and completeness, the various inventive concepts will be described in the context of a UWB terminal with spread-spectrum capability, however, such inventive concepts are likewise suitable for use in various other communication devices. Accordingly any reference to a spread-spectrum UWB terminal is intended only to illustrate the various aspects of the present invention, with the understanding that such aspects have a wide range of applications.

The terminal may be implemented with a transceiver 502 coupled to an antenna 504. A processor 506 may be coupled to the transceiver 502. The processor 506 may be implemented with a software based architecture, or another type of architecture. The software based architecture may be configured with a microprocessor (not shown) that serves as a platform to run software programs that, among other things, provide executive control and overall system management functions that allow the terminal to operate either as a master or member terminal in a piconet. The processor 506 may also include a digital signal processor (DSP) (not shown) with an embedded communications software layer which runs application specific algorithms to reduce the processing demands on the microprocessor. The DSP may be used to provide various signal processing functions such as pilot signal acquisition, time synchronization, frequency tracking, spread-spectrum processing, modulation and demodulation functions, and forward error correction.

The terminal may also include various user interfaces 508 coupled to the processor 506. The user interfaces may include, by way of example, a keypad, mouse, touch screen, display, ringer, vibrator, audio speaker, microphone, camera and/or the like.

Figure 6:
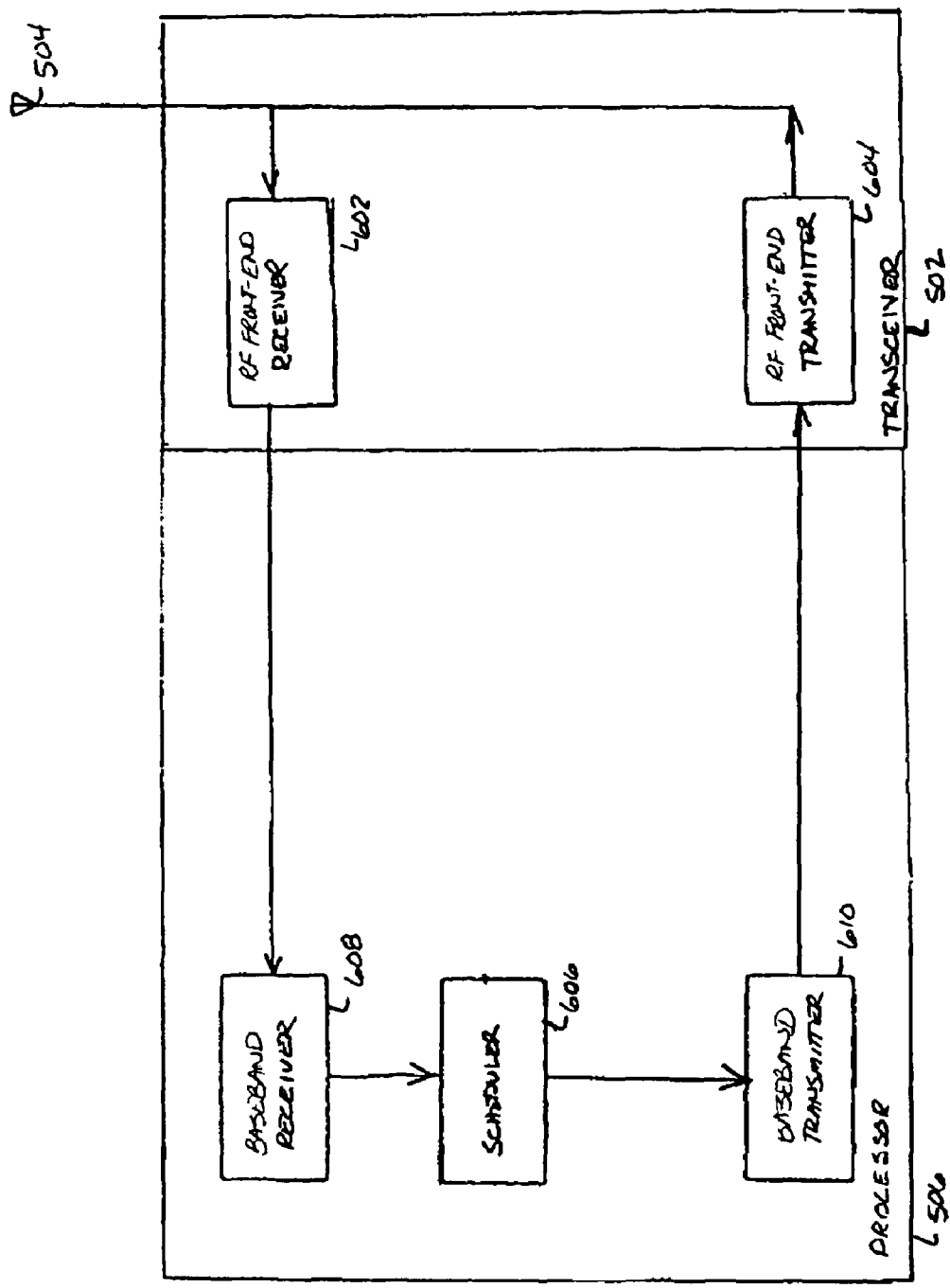
FIG. 6 is a functional block diagram of a transceiver and processor operating as a master terminal of a piconet.

FIG. 6 is a functional block diagram illustrating an example of a processor and transceiver. The transceiver 502 may include a RF front-end receiver 602 and transmitter 604. The RF front-end receiver 602 may be used to detect desired signals in the presence of noise and interference and amplify them to a level where information contained in the signal can be processed by the processor 506. The RF front-end transmitter 604 may be used to modulate information from the processor 506 onto a carrier and amplify the modulated carrier to a sufficient power level for radiation into free space through the antenna 504.

The processor 506 may include a baseband receiver 608 and transmitter 610. The baseband receiver 608 and transmitter 610 may be used for pilot signal acquisition, time synchronization, frequency tracking, spread-spectrum processing, modulation and demodulation functions, forward error correction, and/or any other signal processor functions appropriate to support communications with other terminals. As discussed earlier, these signal processing functions may be implemented with an embedded software layer in a DSP, or alternatively, by any other means.

The processor 506 may enable a scheduler 606 when operating as a master terminal. In the software based implementation of the processor 506, the scheduler 606 may be a software program running on the microprocessor. However, as those skilled in the art will readily appreciate, the scheduler 606 is not limited to this embodiment, and may be implemented by other means known in the art, including a hardware configuration, firmware configuration, software configuration, or any combination thereof, which is capable of performing the various functions described herein.

During call set-up between two terminals in the piconet, the scheduler 606 may be used to negotiate the call. The baseband receiver 608 and transmitter 610 may be used to communicate with the two terminals on the appropriate control channels using spread-spectrum techniques. In this manner, the scheduler 606 may be used to determine the data rate needed to support the call through an exchange of signaling messages. The data rate selected by the scheduler 606 may be based on the type of service requested by means well known in the art. By way of example, if a member terminal initiates a call with another member terminal to support a video application, the scheduler 606 may determine that the call requires a high data rate. If another member terminal initiates a voice call to another member terminal, the scheduler 606 may select a lower data rate to support the call.

The scheduler 606 may also be used to assign a block of time slots to the two terminals during call set-up. The number of time slots assigned by the scheduler 606 may be based on a variety of considerations in accordance with any scheduling algorithm. By way of example, block assignments may be made based on a priority system, where voice communications are given priority over high latency communications. The scheduler 606 may also give priority to high data rate transmissions in an effort to maximize throughput. A fairness criteria that considers the amount of data to be transferred between the two terminals may also be considered. The time slot assignments may be in block form, as described above, or scattered throughout the MAC frame. The time slot assignments may be fixed for the entire call, or may be adjusted during the call based on the current loading of the master terminal. Those skilled in the art will be readily able to adapt existing scheduling algorithms to any particular application.

Figure 7:
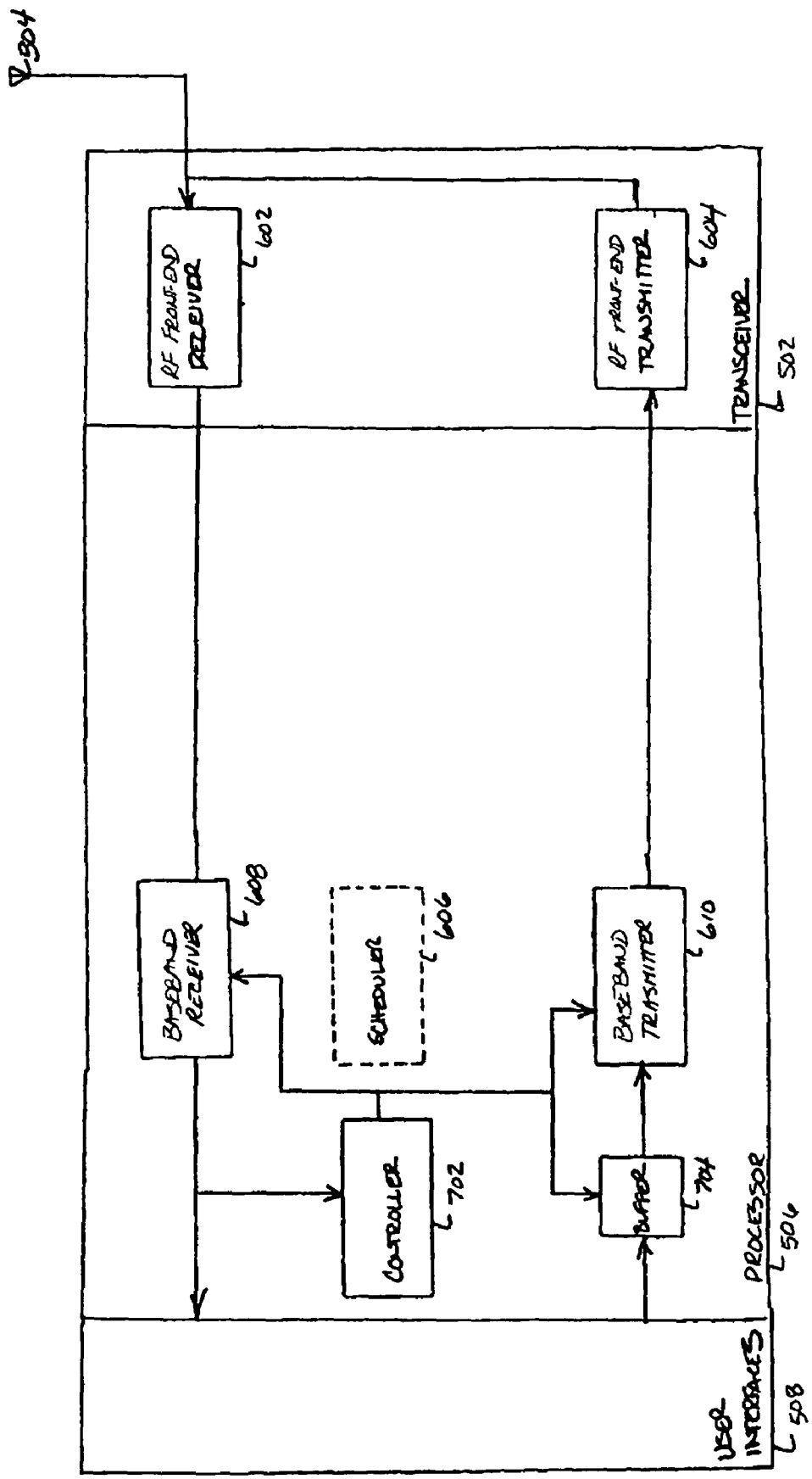
FIG. 7 is a functional block diagram of a transceiver and processor operating as a member terminal capable of functioning as a piconet edge terminal.

The scheduler 606 in the master terminal may be used to assign one or more member terminals as piconet edge terminals. FIG. 7 is a functional block diagram illustrating an example of a terminal with the processor 506 configured as a member terminal capable of functioning as a piconet edge terminal. The scheduler 606 is shown with dashed lines illustrating that it is not enabled by the processor 506 during operation as a member terminal. The configuration of the transceiver 502 is the same whether the processor 506 is operating as a master terminal or a member terminal, and therefore, will not be discussed any further. The transceiver 502 is shown for completeness.

As discussed earlier in connection with the processor 506 configured as a master terminal, the scheduling assignments may be broadcast to all member terminals in the piconet over one or more control channels. The scheduling assignments may include time slot assignments for various transmissions to and from the member terminals, as well as the power level and data rate for each. Included in these scheduling assignments may be one or more piconet edge terminal designations. These piconet edge terminal designations are basically instructions or commands addressed to individual member terminals requesting that they function as piconet edge terminals.

Referring to the member terminal shown in FIG. 7, the baseband receiver 608 may employ spread-spectrum processing to extract the schedule assignments from the control channel and provide them to a controller 702. The controller 702 may be implemented as a separate entity as shown in FIG. 7, or alternatively, be integrated with the baseband receiver 608 and/or transmitter 610. In the software based implementation of the processor 506, the controller 702 may be a software program running on the microprocessor. However, as those skilled in the art will readily appreciate, the controller 702 is not limited to this embodiment, and may be implemented by other means known in the art, including a hardware configuration, firmware configuration, software configuration, or any combination thereof, which is capable of performing the various functions described herein.

The controller 702 may use the scheduling assignments to synchronize communications with other terminals in the piconet. By way of example, the controller 702 may alert the baseband receiver 608 to an incoming communication. The controller 702 may also provide data rate and spreading information to the baseband receiver 608. In response, the baseband receiver 608 may recover the communications using spread-spectrum processing and provide the recovered communications to the various user interfaces 508.

The controller 702 may also use the scheduling assignments to coordinate scheduled transmissions. The information to be transmitted by the member terminal may be generated from the various user interfaces 508 and stored in a buffer 704 until the scheduled transmission. At the scheduled time, the controller 702 may be used to release the information from the buffer 704 to the baseband transmitter 610 for spread-spectrum processing. The data rate, spreading code and transmission power level may be programmed into the baseband transmitter 610 by the controller 702. Alternatively, the transmission power may be programmed by the controller 702 at the RF front-end transmitter 604 in the transceiver 502.

The controller 702 may be used to determine whether the scheduling assignment requires the member terminal to function as a piconet edge terminal. As discussed earlier, member terminals located at the edge of the piconet are generally designated by the master terminal as piconet edge terminals. Feedback from the various member terminals may be used by the master terminal to determine these designations. If the controller 702 determines that the member terminal has been designated as a piconet edge terminal, it may enable the baseband receiver 608 to listen for pilot signals from foreign terminals. The term "foreign terminal" means a terminal outside the local piconet including isolated terminals as well as master and member terminals in other piconets. The term "local piconet" means the piconet to which the piconet edge terminal under discussion belongs. When the baseband receiver 608 detects a pilot signal from a foreign terminal, it may report the signal strength of the signal to the controller 702. If the controller determines that the signal strength of the pilot signal is too low to establish some type of synchronous communications, the controller 702 may add the foreign terminal to its peer-to-peer connectivity list. If the foreign terminal is from a remote piconet, the controller 702 may also obtain through an exchange of signaling messages a list of all terminals in the remote terminal and map those terminals to the foreign terminal. The term "remote piconet" may be used to refer to any piconet outside the local piconet. The controller 702 may also forward a list of terminals in the local piconet to the foreign terminal.

The controller 702 may be used to listen for peer-to-peer transmissions whenever the piconet edge terminal is idle. The piconet edge terminal may be considered idle when it is not scheduled for an intra-piconet communication or a peer-to-peer transmission. Peer-to-peer transmissions from foreign terminals may occur at very low data rates (e.g., 100 kbps or lower), using a high spreading factor so that the communications may be decoded at the baseband receiver 608 even in the presence of simultaneous intra-piconet transmissions.

The scheduler 606 in the master terminal may also set aside a number of time slots for one or more piconet edge terminals to engage in peer-to-peer transmissions (see FIG. 6). The peer-to-peer transmissions may require high transmit power, and in some instances, can only be sustained at low data rates. If high power transmissions are used to communicate with foreign terminals, the scheduler 606 may decide not to schedule any other transmissions at the same time.

Although the peer-to-peer transmissions from the piconet edge terminal to a foreign terminal may be scheduled by the master terminal, there may be some uncertainty as to when the foreign terminal is ready to receive the transmission. Moreover, the timing of the transmissions from the foreign terminal back to the piconet edge terminal may also be unknown. The controller 702 may be used to reduce the number of peer-to-peer transmissions that are lost due to the asynchronous manner in which the communications take place.

The manner in which the controller 702 increases the reliability of communications over a peer-to-peer connection may vary depending on the particular application and overall design constraints. By way of example, if a local terminal in a local piconet initiates a call with a remote terminal, which happens to be an isolated terminal, the controller 702 may monitor the exchange of signaling messages between the local and remote terminals during call set-up to determine the nature of the call. If the controller 702 determines that the call involves high latency communications, such as a web page download or text messaging, feedback across the peer-to-peer connection may be used to ensure that the peer-to-peer transmission was properly received. An acknowledgement (ACK) and/or negative acknowledgement (NACK) based protocol may be used. With this approach, communications between the local and remote terminals may be monitored with ACK and NACK messages over the peer-to-peer connection. If the piconet edge terminal is able to receive a peer-to-peer transmission from the remote terminal, for example, it may forward the transmission to the local terminal and send an ACK message back to the remote terminal over the peer-to-peer connection. If, on the other hand, the remote terminal does not receive an ACK message from the piconet edge terminal within a certain time period, or receives a NACK message, it may retransmit the communication to the piconet edge terminal over the peer-to-peer connection.

In response to a transmission from the piconet edge terminal, the ACK or NACK message generated by the remote terminal may be transmitted on a separate control channel, or alternatively, punctured into another control channel or the traffic channel. The baseband receiver 608 of the piconet edge terminal may use spread-spectrum processing to recover the ACK or NACK message and provide it to the controller 702. If the controller 702 determines from the ACK message that the transmission to the remote terminal was successfully decoded, then no further transmissions are required. If, on the other hand, the controller 702 determines from the absence of an ACK message, or the presence of a NACK message, that the transmission to the remote terminal was not successfully decoded, then the controller 702 may pull from the buffer 704 the same information previously transmitted, and provide it to the RF front-end transmitter 604 for retransmission.

In response to a transmission from the remote terminal, an ACK or NACK message produced by the piconet edge terminal may be generated by the baseband receiver 608. More specifically, the baseband receiver 608 may perform a decoding function on the received transmission and generate an ACK message if the transmission is successfully decoded. The ACK message may be provided to the RF front-end transmitter 610 and spread with the appropriate code, either by itself, or as a message punctured into another control or traffic channel.

The ACK and/or NACK based protocol may provide high reliability for peer-to-peer transmissions for high latency communications. However, in time sensitive applications, such as a voice, the controller 702 may need to communicate with the remote terminal in a different way. By way of example, the controller 702 may be configured to schedule all time sensitive communications at a low data rate with a high spreading factor. These communications may also be scheduled for high power transmissions. Multiple transmissions of the same information may also be scheduled.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications from a piconet, comprising:
   by an edge terminal of the piconet,
       engaging in intra-piconet communications;
       receiving a pilot signal from a foreign terminal outside the piconet;
       determining a strength of the pilot signal;
       exchanging messages with the foreign terminal if the pilot signal strength is below a threshold;
       establishing a peer-to-peer connection with the foreign terminal;
       monitoring an exchange of signaling messages pursuant to a call between a local terminal in the piconet, and a remote terminal outside the piconet;
       determining whether the call involves high-latency communications; and
       if so, providing feedback relating to the call between the local terminal and the remote terminal.

2. The method of claim 1 wherein the exchanged messages comprise a transmission to the foreign terminal including a list of a plurality of terminals in the piconet.

3. The method of claim 2 wherein the foreign terminal is a member of a remote piconet, and wherein the exchanged messages comprise receiving from the foreign terminal a list of a plurality of terminals in the remote piconet.

4. The method of claim 3 further comprising mapping the list of terminals in the remote piconet to the foreign terminal.

5. The method of claim 1 wherein the establishment of the peer-to-peer connection comprises negotiating a data rate and transmission power level.

6. The method of claim 5 wherein the establishment of the peer-to-peer connection further comprises negotiating code to spread peer-to-peer communications.

7. The method of claim 1 further comprising listening for a transmission from the foreign terminal when not engaged in the intra-piconet communications.

8. The method of claim 7 wherein the transmission is received while listening for it, the method further comprising forwarding the received transmission to a terminal within the piconet.

9. The method of claim 8 further comprising receiving instructions to engage in the intra-piconet communications during a first time period and to forward the received transmission to the terminal in a second time period.

10. The method of claim 9 wherein the first time period is different from the second time period.

11. The method of claim 8 further comprising spreading the received transmission with a code.

12. The method of claim 8 further comprising providing feedback to the foreign terminal acknowledging that the transmission from the foreign terminal was received.

13. The method of claim 1 further comprising receiving a transmission from a terminal within the piconet, and forwarding the received transmission to the foreign terminal.

14. The method of claim 13 further comprising receiving instructions to engage in the intra-piconet communications during a first time period, receiving the transmission from the terminal in a second time period, and forwarding the received transmission to the foreign terminal in a third time period.

15. The method of claim 14 wherein the first, second and third time period are all different from one another.

16. The method of claim 13 wherein the received transmission is spread with a first code, the method further comprising despreading the received transmission with the first code and spreading the received transmission with a second code.

17. The method of claim 13 further comprising receiving feedback from the foreign terminal indicating that the received transmission forwarded to the foreign terminal was received by the foreign terminal.

18. The method of claim 13 wherein the forwarding of the received transmission to the foreign terminal comprises transmitting the received transmission to the foreign terminal a plurality of times.

19. The method of claim 1, wherein engaging in intra-piconet communications further comprises:
   receiving a pilot signal from a master terminal;
   determining that the strength of the pilot signal from the master terminal is below a threshold;
   transmitting a pilot signal; and
   establishing a new piconet in response to a foreign terminal requesting synchronous communication.

20. The method of claim 1, further comprising:
   determining that the strength of the pilot signal is above the threshold; and
   registering as member of a piconet with the foreign terminal.

21. A communications terminal configured to operate in a piconet, comprising:
   a receiver configured to, operating as a component of an edge terminal of the piconet, detect a pilot signal from a foreign terminal outside the piconet and determine its strength; and a controller configured to, operating as another component of the edge terminal of the piconet, exchange messages with the foreign terminal to facilitate establishing a peer-to-peer connection with the foreign terminal if the pilot signal strength is below a threshold, the controller further being configured to support intra-piconet communications;

wherein the controller is further configured to
monitor an exchange of signaling messages pursuant to a call between a local terminal in the piconet, and a remote terminal outside the piconet,
determine whether the call involves high-latency communications, and
if so, provide feedback relating to the call between the local terminal and the remote terminal.

22. The communications terminal of claim 21 wherein the controller is further configured to generate a list of a plurality of terminals in the piconet for transmission to the foreign terminal as part of the exchanged messages.

23. The communications terminal of claim 22 wherein the controller is further configured to receive from the foreign terminal operating in a remote piconet a list of a plurality of terminals in the remote terminal as part of the exchanged messages.

24. The communications terminal of claim 23 wherein the controller is further configured to map the list of terminals in the remote piconet to the foreign terminal.

25. The communications terminal of claim 21 wherein the controller is further configured to establish the peer-to-peer connection by negotiating a data rate and transmission power level.

26. The communications terminal of claim 25 wherein the controller is further configured to establish the peer-to-peer connection by negotiating code to spread peer-to-peer communications.

27. The communications terminal of claim 21 wherein the controller is further configured to detect a transmission from the foreign terminal when it is not engaged in the intra-piconet communications.

28. The communications terminal of claim 21 wherein the controller is further configured to forward the detected transmission to a terminal within the piconet.

29. The communications terminal of claim 28 wherein the controller is further configured to receive instructions to engage in the intra-piconet communications during a first time period and to forward the detected transmission to the terminal in a second time period.

30. The communications terminal of claim 29 wherein the first time period is different from the second time period.

31. The communications terminal of claim 29 further comprising a transmitter configured to spread the detected transmission with a code.

32. The communications terminal of claim 28 wherein the controller is further configured to provide feedback to the foreign terminal acknowledging that the transmission from the foreign terminal was detected.

33. The communications terminal of claim 21 wherein the controller is further configured to receive a transmission from a terminal within the piconet, and forward the received transmission to the foreign terminal.

34. The communications terminal of claim 33 wherein the controller is further configured to receive instructions to engage in the intra-piconet communications during a first time periods, receive the transmission from the terminal in a second time period, and forward route the received transmission to the foreign terminal in a third time period.

35. The communications terminal of claim 34 wherein the first, second and third time periods are all different from one another.

36. The communications terminal of claim 33 wherein the received transmission is spread with a first code, and wherein the receiver is further configured to despread the received transmission with the first code, the communications terminal further comprising a transmitter configured to spread the received transmission with a second code.

37. The communications terminal of claim 33 wherein the controller is further configured to receive feedback from the foreign terminal indicating that the received transmission forwarded to the foreign terminal was received by the foreign terminal.

38. The communications terminal of claim 33 further comprising a transmitter, the controller further being configured to forward the received transmission to the foreign terminal by causing the transmitter to transmit the received transmission to the foreign terminal a plurality of times.

39. The communications terminal of claim 21, wherein the receiver is further configured to detect a pilot signal from a master terminal and determine its strength, and the controller is further configured to transmit a pilot signal if the pilot signal from the master terminal strength is below a threshold.

40. The communications terminal of claim 39, wherein the controller is further configured to establish a new piconet in response to a foreign terminal requesting synchronous communication.

41. The communications terminal of claim 21, wherein the controller further configured to register as a member of a piconet with the foreign terminal to support communications if the pilot signal strength is above the threshold.

42. A communications terminal configured to operate in a piconet, comprising:
means for, operating as a component of an edge terminal of the piconet, detecting a pilot signal from a foreign terminal outside the piconet and determining the strength of the detected pilot signal;
means for, operating as another component of the edge terminal of the piconet, exchanging messages with the foreign terminal to facilitate establishing a peer-to-peer connection with the foreign terminal if the pilot signal strength is below a threshold;
means for supporting intra-piconet communications;
means for monitoring an exchange of signaling messages pursuant to a call between a local terminal in the piconet, and a remote terminal outside the piconet; and
means for determining whether the call involves high-latency communications, and if so, providing feedback relating to the call between the local terminal and the remote terminal.

43. A communication device configured to:
from a master terminal of a piconet, receive a designation as an edge terminal in the piconet;
based on being designated an edge terminal, listen for pilot signals from isolated terminals not included in the piconet;
if a pilot signal with a signal strength below a threshold is detected from an isolated terminal, add the isolated terminal to a peer-to-peer connectivity list, the peer-to-peer connectivity list identifying terminals outside the piconet that can be reached with peer-to-peer transmission;
route a call from the isolated terminal to a far-end terminal of the piconet, based on being included in a peer-to-peer connectivity list of the isolated terminal identifying each known edge terminal of the piconet;

monitor an exchange of signaling messages pursuant to a call between a local terminal in the piconet, and a remote terminal outside the piconet;
determine whether the call involves high-latency communications; and if so, provide feedback relating to the call between the local terminal and the remote terminal.

* * * * *